US012786682B2

(12) United States Patent
Meier et al.

(10) Patent No.: US 12,786,682 B2
(45) Date of Patent: *Nov. 3, 2026

(54) WIRELESS COMMUNICATIONS PROTOCOL WITH DISCONNECTION TOLERANCE

(71) Applicant: Bitstrata Systems Inc., Saskatoon (CA)

(72) Inventors: Ian Robert Meier, Saskatoon (CA); Michael David Lockerbie, Saskatoon (CA)

(73) Assignee: Bitstrata Systems Inc., Saskatoon (CA)

( * ) Notice: Subject to any disclaimer, the term of this patent is extended or adjusted under 35 U.S.C. 154(b) by 241 days.

This patent is subject to a terminal disclaimer.

(21) Appl. No.: 18/779,187

(22) Filed: Jul. 22, 2024

(65) Prior Publication Data

US 2024/0381065 A1 Nov. 14, 2024

Related U.S. Application Data

(63) Continuation of application No. 18/212,464, filed on Jun. 21, 2023, now Pat. No. 12,082,295, which is a continuation of application No. 17/824,447, filed on May 25, 2022, now Pat. No. 11,722,878, which is a continuation of application No. 17/029,994, filed on Sep. 23, 2020, now Pat. No. 11,375,356.

(Continued)

(51) Int. Cl.

| | |
|---|---|
| ***H04W 76/25*** | (2018.01) |
| ***H04W 8/00*** | (2009.01) |
| ***H04W 52/02*** | (2009.01) |
| ***H04W 76/10*** | (2018.01) |

(52) U.S. Cl.

CPC ....... *H04W 8/005* (2013.01); *H04W 52/0209* (2013.01); *H04W 76/25* (2018.02)

(58) Field of Classification Search

CPC . H04W 8/005; H04W 52/0209; H04W 76/25; H04W 52/0229; H04W 76/19; H04W 76/15; H04W 76/10; Y02D 30/70; H04B 3/544; H04B 7/8588

See application file for complete search history.

(56) References Cited

U.S. PATENT DOCUMENTS 11,159,696 B2 10/2021 Terashita et al.
11,375,356 B2 * 6/2022 Meier .................. H04W 76/19

(Continued)

OTHER PUBLICATIONS

"Bluetooth Low Energy", Wikipedia, https://en.wikipedia.org/wiki/Bluetooth_Low_Energy, 16 pages, available as early as Sep. 23, 2020.

(Continued)

*Primary Examiner* — Andrew Wendell
(74) *Attorney, Agent, or Firm* — Lempia Summerfield Katz LLC

(57) ABSTRACT

The disclosed embodiments relate to a system and method which utilizes the benefits of both advertising and bidirectional connections to allow a client/receiving device to receive data, e.g. sensor measurements, from the source/transmitting device during device discovery and connection, thereby minimizing the amount of time during which data, e.g. measurements, are unavailable. The disclosed embodiments may further allow for reduced power consumption by a source device by minimizing data transmission during advertising.

30 Claims, 6 Drawing Sheets

Related U.S. Application Data

(60) Provisional application No. 62/909,372, filed on Oct. 2, 2019.

(56) References Cited

U.S. PATENT DOCUMENTS

| | | | | |
|---|---|---|---|---|
| 11,722,878 | B2 * | 8/2023 | Meier ............... | H04W 52/0229 455/68 |
| 12,082,295 | B2 * | 9/2024 | Meier ............... | H04W 52/0209 |
| 2009/0234728 | A1 | 9/2009 | Willuns et al. | |
| 2015/0109897 | A1 | 4/2015 | Lee et al. | |
| 2018/0095712 | A1 | 4/2018 | Tinuma | |
| 2018/0324553 | A1 | 11/2018 | Zhou et al. | |
| 2019/0007574 | A1 | 1/2019 | Takarabe | |
| 2019/0246257 | A1 | 8/2019 | Hasegawa | |
| 2021/0141073 | A1 | 5/2021 | Okazaki | |
| 2023/0061161 | A1 | 3/2023 | Koch | |

OTHER PUBLICATIONS

Mohammad Afaneh, "The Basics of Bluetooth Low Energy (BLE)", 9 pages, https://www.novelbits.io/basics-bluetooth-low-energy/, May 6, 2016.

Monika Adarsh, "Bluetooth Low Energy (BLE) Beacon Technology Made Simple: A Complete Guide to Bluetooth Low Energy Beacons", https://blog.beaconstac.com/2018/08/ble-made-simple-a-complete-guide-to-ble-bluetooth-beacons/, 12 pages, May 31, 2020.

William Welbes, "What is Bluetooth Low Energy (BLE) and How Does it Work?", 6 pages, https://www.centare.com/blog/what_is_bluetooth_low_energy/, Mar. 7, 2019.

* cited by examiner

System Architecture

Device State Machine

400

Client State Machine

500

WIRELESS COMMUNICATIONS PROTOCOL WITH DISCONNECTION TOLERANCE

RELATED APPLICATIONS

This application is a continuation under 37 C.F.R. § 1.53(b) of U.S. patent application Ser. No. 18/212,464 filed Jun. 21, 2023, now U.S. Pat. No. 12,082,295, which is a continuation under 37 C.F.R. § 1.53(b) of U.S. patent application Ser. No. 17/824,447 filed May 25, 2022, now U.S. Pat. No. 11,722,878, which is a continuation under 37 C.F.R. § 1.53(b) of U.S. patent application Ser. No. 17/029,994 filed Sep. 23, 2020, now U.S. Pat. No. 11,375,356, which claims the benefit of the filing date under 35 U.S.C. § 119(e) of U.S. Provisional Application Ser. No. 62/909,372, filed Oct. 2, 2019, all of which are incorporated by reference herein and relied upon.

BACKGROUND

Wirelessly-enabled sensing/source devices, or other data source devices, e.g. data gathering or data generating devices, may be configured to collect measurements or data representative of other sensed, gathered, derived or generated parameters, such as from one or more sensing or detection devices (weight, temperature, humidity, optical, audio, etc.), and transmit, communicate, or otherwise make this data available, to a separate, wirelessly enabled/connected client/receiving device which may be remote from the sensing/source device.

Certain wireless protocols support multiple means of communication between such devices. As an example, Bluetooth Low Energy (BLE) supports either an advertisement-based method of communication, where data is sent unidirectionally/one-way in a broadcast manner, or a full/bidirectional connection-based method, where data is sent two-way/bidirectionally using a reliable connection, i.e. using a communication protocol which assures receipt by a receiver of communications transmitted by the transmitter/source device. Such BLE chipsets may include the CC2540 or CC2640 by Texas Instruments.

Source devices may solicit connections with client devices by, first, transmitting advertisements, known as advertising packets, which, in one embodiment, contain sufficient data to enable a connection to be established with the source device. These advertising packets may further be used to transmit, i.e. broadcast, other data such as data generated by the source device as described herein. A client device, such as a smartphone or tablet or other receiving device, may listen for the advertisements, both as a way to receive data and as a way to discover devices with which to connect. Once an advertising packet has been received, the client device can initiate a connection request with the source device to establish a bidirectional connection. Once the connection is established, the connection can then be used to communicate commands and/or data in both directions between the client device and the source device, such as the sensing device.

The connection-based method of communication is generally more reliable than the advertising method due to the reliable characteristic of the protocol, e.g. the packet retransmission features of the protocol and assigned protocol timeslots, but the physical communication distance between the devices that can be achieved with the connection method may be less than may be achieved with the advertising method due to the overhead and complexity of the protocol used by the connection method, the intolerance of the connection to temporary interruption, and the increased difficulty of sustaining a bidirectional communication versus a unidirectional communication.

While the advertising method is less reliable on a packet-to-packet basis, the wireless communications range may be generally superior since the communication is only in one direction, and increasing the advertising transmission rate can compensate for decreased transmission reliability at the expense of increased power consumption. Also, the amount of time needed to negotiate and establish a successful connection between devices depends on a number of factors, including the advertising packet transmission rate, the amount of time allotted for the device to accept and establish the connection, and the time to discover the data elements available for reading by the client. This all results in a delay from the time at which the connection is attempted, and the time at which valid data results become available to the client.

In a mobile environment, the distance between the client device and the source/transmitting, e.g. sensing, device may be variable, causing a bidirectional connection to repeatedly connect and disconnect. This cycling may also occur because of wireless interference. For bidirectional connections, there is a desire to minimize the time during which data is unavailable due to these reconnection cycles, in order to provide a seamless user experience and prevent data loss while mitigating or minimizing power consumption.

DETAILED DESCRIPTION

Figure 1:
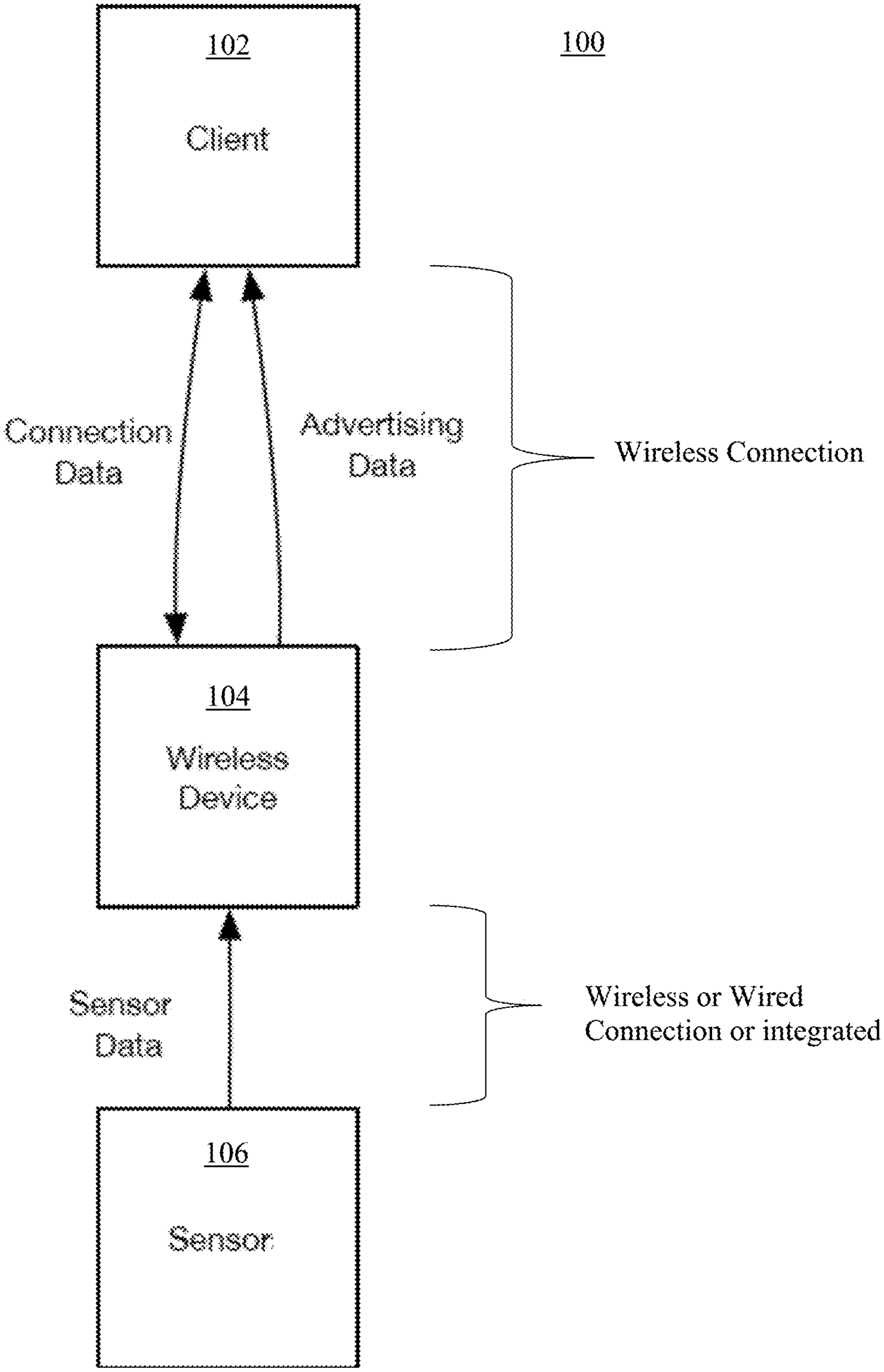
FIG. 1 depicts an example architecture for communication between a client device and a source device according to the disclosed embodiments.

The disclosed embodiments relate to a system and method which utilizes the benefits of both advertising/unidirectional and bidirectional connections to allow a client/receiving device to receive data, e.g. sensor measurements, from the source/transmitting device during device discovery and connection, thereby minimizing the amount of time during which data, e.g. measurements, are unavailable. The disclosed embodiments may further allow for reduced power consumption by a source device by minimizing data transmission during advertising.

While the disclosed embodiments will be described with reference to receiving data from a sensing device, it will be appreciated that the disclosed embodiments may be implemented with other source devices, including devices which generate or obtain data, or may act as relays to relay or otherwise retransmit data received, directly or indirectly, from another source device. For example, the disclosed embodiments may be utilized with devices which are used to form a mesh communications network.

In an application where power consumption is not a constraint, such as when, for example, the sensing device is hardwired or otherwise coupled with a permanent or otherwise high capacity power source or when the sensing device is low-power, the sensing device may be configured to continually generate data, e.g. measurements, indicative of a sensed parameter from the sensors and advertise this data, i.e. include the data indicative of the sensed parameter within the advertising packets. As will be described, in one embodiment, when a disconnection occurs, the sensing device may be configured to include the generated data in the advertising packets so that a suitably configured client device, still able to receive the advertising packets, may retrieve that data from the advertising packets, e.g., while it attempts to reconnect.

However, in power-sensitive applications, such as battery-operated implementations and/or where the sensor is not low-power, measurements may need to be enabled by the client device after connection and disabled after disconnection so as to conserve power. In this case the client needs to connect to the sensing device in order to enable the generation/transmission of the data indicative of the sensed parameter, which prevents the client device from being able to receive these measurements while not connected.

A solution to this problem is, in one embodiment, to allow the sensing device to temporarily continue generating the data indicative of the sensed parameter after disconnection, before returning to its idle/low power state, and transmit that data via advertising packets for a particular period of time, referred to as the "measurement" timeout. If the measurement timeout is longer than the period of time during which the client device is disconnected, it provides for a user experience with improved tolerance to temporary disconnections as the data will be available for the client device to, if capable, receive during the disconnection and the client device will reconnect before such transmissions cease, e.g., there will be no disruption in the receipt of measurement data by the client device due to the disconnection.

FIG. 1 illustrates an example architecture 100 of one embodiment of the system described above, including one or more client devices 102, such as a smartphone or tablet, one or more wireless sensing/source devices 104, such as Bluetooth enables transmitter/beacon devices, which may be further coupled or integrated with one or more sensors 106, such as a temperature or weight sensor.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
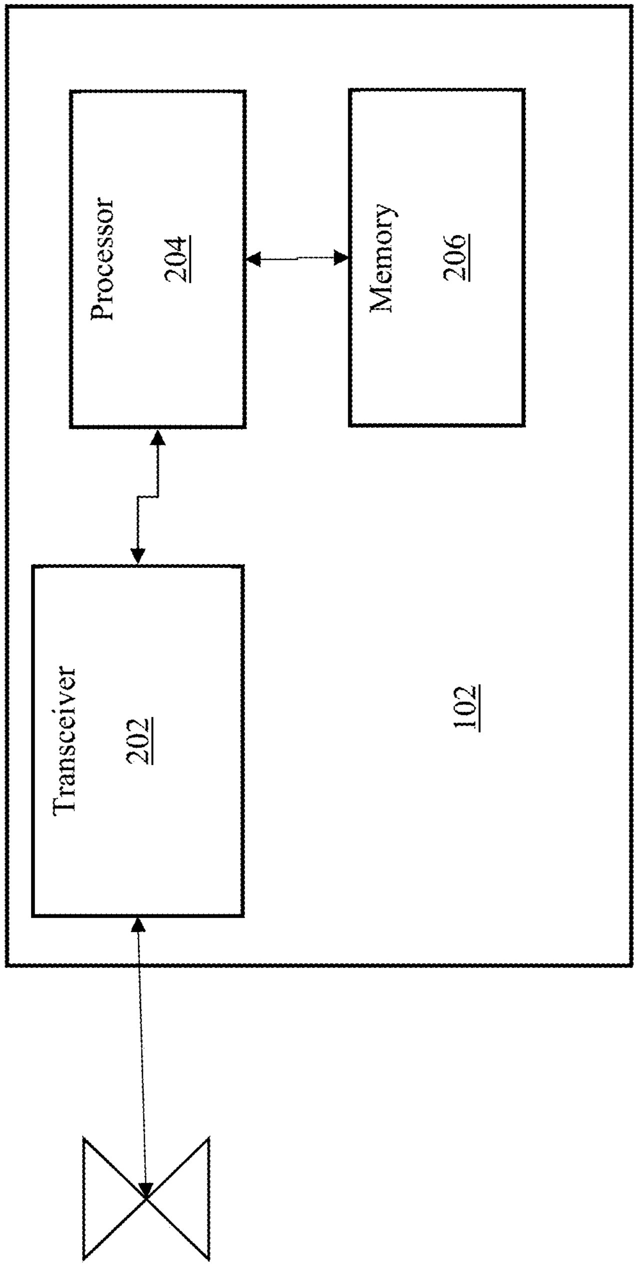
FIG. 2 depicts a block diagram of an example client device according to the disclosed embodiments.

FIG. 2 depicts a block diagram of an example client device 102 according to one embodiment. The client device 102 includes a communication component 202, such as a radio, e.g., a Bluetooth, Zigbee or WiFi transceiver, a processor 204 and a memory 206 coupled therewith. In one embodiment, the processor 204 and memory 206 may be implemented as the processor 604 and memory 606 described below with respect to FIG. 6. The communications device 202, processor 204 and memory 206 may be implemented as separate components or may be integrated together, such as on a common substrate, or otherwise combined into one or more fewer components, such as in an implementation using a field programmable gate array ("FPGA") or application specific integrated circuit ("ASIC"). It will be appreciated that the client device 102 may further include input/output devices, such as a display, keyboard, touch interface, etc., as well other storage devices and communications interfaces, such as a wired or wireless network communications interface as described below with respect to FIG. 6. The memory 206 may contain computer executable instructions or logic which, when executed by the processor 204, cause the processor to implement one or more applications, including a communications application which operates in accordance with the disclosed embodiments and may implement the functionality of FIG. 5 to establish connections with sensing/source devices 104 to receive data therefrom and/or send commands thereto. The applications may further include a data processing application to process and/or display the data received from a source device 104. In one embodiment, the client device 102 comprises smart phone or tablet device or other off the shelf device having a suitable communications interface, e.g., Bluetooth, for communicating with the sensing/source devices 104 and has been suitably programmed, as described herein, to implement the disclosed functionality.

Figure 3:
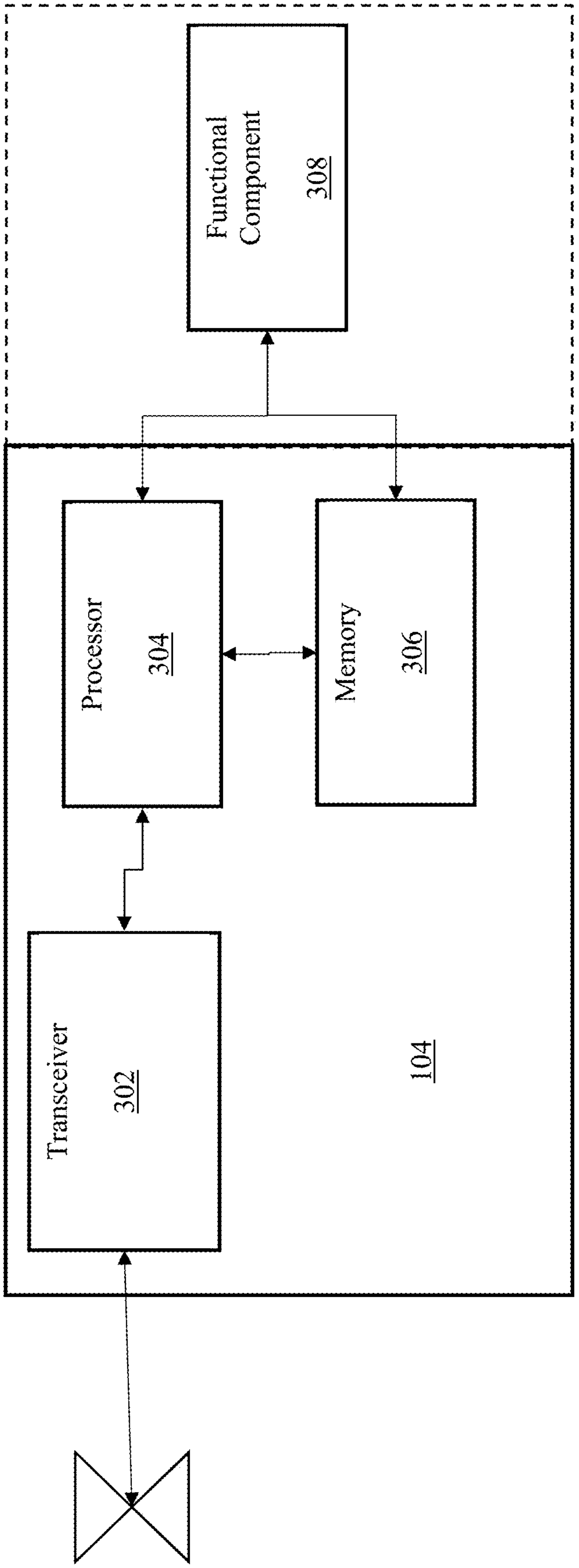
FIG. 3 depicts a block diagram of an example source device according to the disclosed embodiments.

FIG. 3 depicts a block diagram of an example sensing/source device 104 according to one embodiment. The sensing/source device 104 includes a communication component 302, preferably compatible with the communication component 202 of the client device 102, such as a radio, e.g., a Bluetooth, Zigbee or WiFi transceiver, a processor 304 and a memory 306 coupled therewith. The source device may further include a power source (not shown) which may be battery, solar cell, or electrical connection. In one embodiment, the processor 304 and memory 306 may be implemented as the processor 604 and memory 606 described below with respect to FIG. 6. The communications device 302, processor 304 and memory 306 may be implemented as separate components or may be integrated together, such as on a common substrate, or otherwise combined into one or more fewer components, such as in an implementation using a field programmable gate array ("FPGA") or application specific integrated circuit ("ASIC"). It will be appreciated that the source device 104 may further include input/output devices, such as a display, keyboard, touch interface, etc., as well other storage devices and communications interfaces, such as a wired or wireless network communications interface as described below with respect to FIG. 6. The memory 306 may contain computer executable instructions or logic which, when executed by the processor 304, cause the processor to implement one or more applications, including a communications application which operates in accordance with the disclosed embodiments and may implement the functionality of FIG. 4 to establish connections with client devices 102 to receive commands therefrom and/or send data thereto. The source device 104 includes, or is coupled with, one or more functional component/device 308 which implements one or more functions such as sensing a measurable parameter, gathering data or other function. The functional component 308 may include a sensing component, such as a sensor which senses an environmental or other measurable parameter, e.g., temperature, humidity, air pressure, moisture content, capacitance, resistance, ambient light, or other data gathering device, such as a counter, timer, scale, communications device, etc. The functional component 308 may provide processed or unprocessed analog or digital signals representative of data produced, e.g. sensed or gathered, thereby to the processor. The functional component 308 may integrated with, e.g., within the same housing, package or on the same substrate, or separate from and connected, wirelessly, via a wire or otherwise, to the source device 104. In one embodiment, the source device 104 comprises a sensor device or other data gathering device having a suitable communications interface, e.g., Bluetooth, for communicating with the client devices 102 and has been suitably programmed, as described herein, to implement the disclosed functionality.

Figure 4:
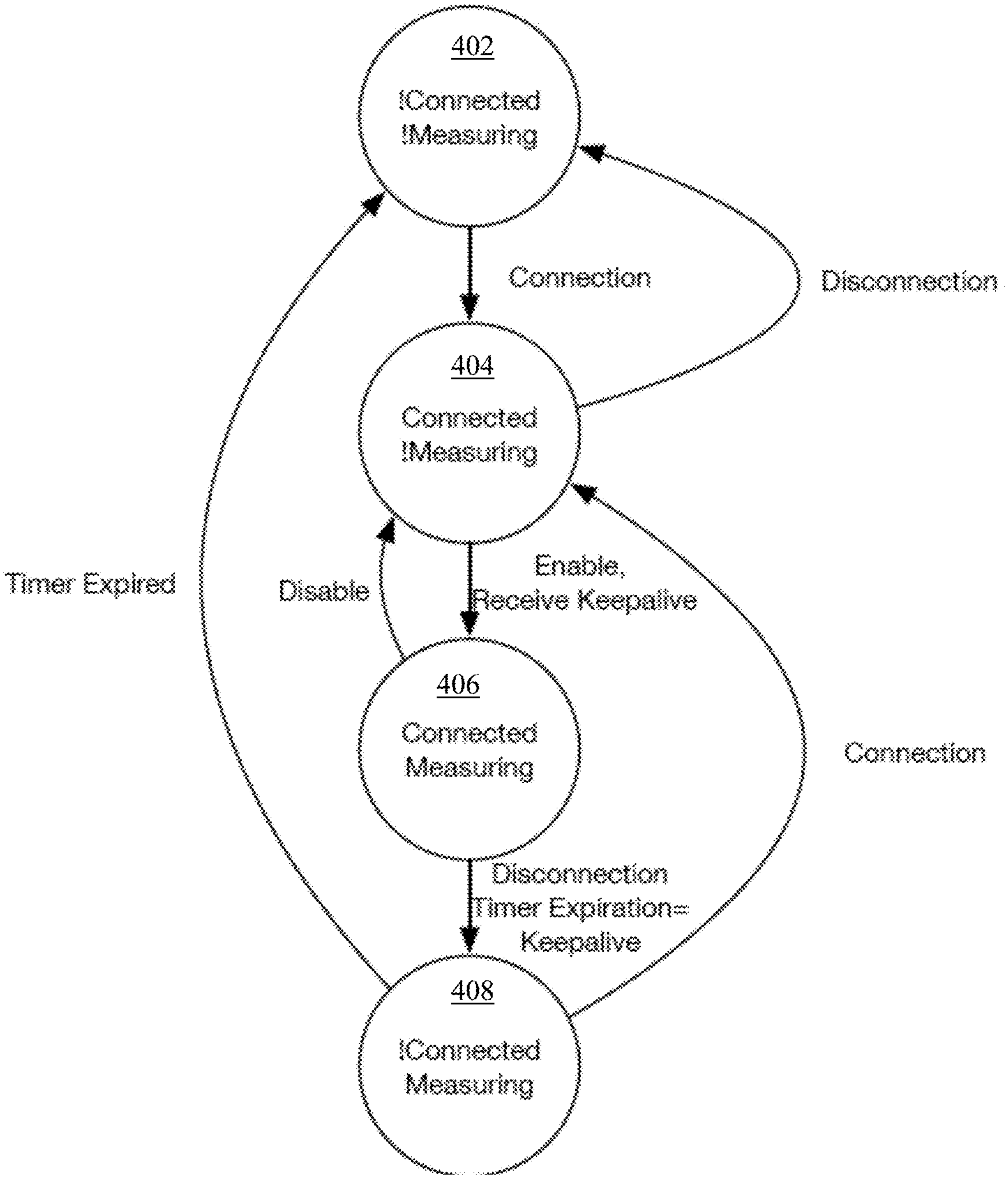
FIG. 4 illustrates a state/flow diagram which depicts the operation of the source device of FIG. 3, according to the disclosed embodiments.

FIG. 4 illustrates a state/operating mode/flow diagram 400 which depicts the operations of the sensing, or other source, device 104 according to the disclosed embodiments, with states or operating modes 402 404 406 408 representing the four combinations of connected/not connected and measuring/not measuring state (also referred to as operating modes). It will be appreciated that the state/operating modes of the source device 104 are implementation dependent and a given source device 104 may feature more or fewer operating modes. The source device 104 may start in the not connected and not measuring state 402. In this state, the source device 104 is transmitting advertising packets comprising sufficient information/data to enable a connection, but no generated data. The rate or interval at which advertising packets are transmitted may be generally fast enough to provide a reasonably fast discovery time, but slow enough to conserve power. An advertising rate of one packet every two to three seconds is typical in this mode, though faster or slower rates may be used. It remains in this state until a client device connects to it, transitioning it to the connected and not measuring state 404. The client device 102, upon receiving at least one of these advertising packets and choosing to establish a connection with the source device 104 based thereon, will establish a connection with the source device 104, putting it in the connected and not measuring state 404, and then transmit a command to the source device 104, which, upon receipt thereby, will cause the source device 104 to enable measuring (for source devices 104 which do not continuously measure) and, if necessary, set the measurement timeout and transitioning it to the connected and measuring state 406. It will be appreciated that the measurement timeout may be defined in other ways, such as via a pre-configured setting, or where not specified by the client device 102, it may default to previously used timeout value. In one embodiment, upon establishing a connection with a client device 102, the source device 104 may immediately enable measuring without waiting for a command from the client device 102, i.e., the source device 104 may switch directly from the not connected not measuring state 202 to the connected measuring state 406 (or, as will be described, from the not connected measuring state 408 to the connected measuring state 206), the state of connected not measuring 404 not being included.

During the connected and measuring state 406, the source device 104 may obtain sensed parameters, or data indicative thereof, from the one or more sensors 106, generates or derives, if necessary, data indicative thereof, and communicates the generated data indicative of/derived from the sensed parameter(s), e.g. the measurements or derived data based thereon, to the client device 102. In an alternative embodiment, the source device 104 also continues to transmit advertisement packets carrying, in addition to the data sufficient to enable a connection to be established, that same generated measurement/derived data at, for example, a higher advertising rate, say two to three packets per second, so that other client devices 102, which are not connected but able to receive, may receive the data as well. For example, in a multi-connection implementation where the source device 104 may establish simultaneous connections with multiple different client devices 102, the advertising function, in parallel with connection-based communications, as described herein, may be used when any one client device 102 loses their connection.

After the client device 102 disconnects, either intentionally or unintentionally, from the source device 104, the source device 104 may transition to the not connected and measuring state 408, where it continues to make measurements and communicate the generated data indicative thereof via advertising transmissions, which may be at the higher advertising rate or a different rate, for the duration of the measurement timeout. If the client device 102 is still able to at least receive the advertising packets, then the measured data generated during the disconnection will be available thereto. If the client device 102 reconnects before the timeout, the client device 102 will be able to receive measurements immediately and reestablish a connection, e.g., without disruption to the receipt of data. Assuming, that during the timeout, the client device 102 is able to receive the advertising packets but not otherwise reestablish communication with the source device 104, the client device 102 will still receive the measurements communicated during the timeout period. During this state, the source device 104 may also be configured to store any generated data, e.g. sensor readings, in an internal memory until such time that the client device 102 reconnects to collect that stored data. If the client device 102 doesn't reconnect before the timeout, the source device 104 may transition back to the not connected and not measuring state 402. In one embodiment, if the client device 102 intentionally disconnects from the source device 104, e.g. by transmitting a disconnect command, the source device 104 returns to the not connected and not measuring state 202 immediately. In one embodiment, during, for example, the designated period of time after a disconnection, the source device 104, while broadcasting advertising packets with the generated data, will reject attempts to establish a connection from client devices 102 other than the client device 102 which was just previously connected, i.e., the source device 104 will have an affinity for, or otherwise prioritize, the prior connected client device 102 so that the prior connected device 102 is not prevented from doing so when it is able.

In an alternative embodiment, the measuring/not connected state 408 of the source device 104 may be replaced by a low power measuring/not connected state (mode of operation) (not shown) instead. In this low power measuring state/mode, the source device 104 continues to make measurements with the additional benefit of providing a responsive user experience even after the timeout has occurred, at the expense of additional, but lesser than normal, power consumption.

In particular, the low power measurement operation may allow the source device 104 to make a lower-quality, or less frequent, lower-power measurement as a way to detect whether a change in sensed parameter has occurred, in order to trigger making a high-quality measurement. The lower-quality may take on different forms, including using a lower-power alternative sensor, or by decreasing frequency of sensing or the amount of analog signal conversion time, as measurement quality often increases with the amount of conversion time. By understanding the statistics of the measured sensor, statistically-significant changes in the low-quality measurement can indicate a change in the measured variable, thus trigger a high quality measurement only when necessary. Increased sensitivity to these changes, both in terms of how quickly they are recognized and the resolution of the detected change itself, generally requires increased power consumption. This is because more frequent measurement may be needed to reduce the detection time, and more precise measurements may be needed to detect, or otherwise discriminate among, smaller changes, which requires longer conversion times. Note that low power measurements can be used in any state, but may only be reserved for the lowest-power state in order to maximize performance in the other states.

Figure 5:
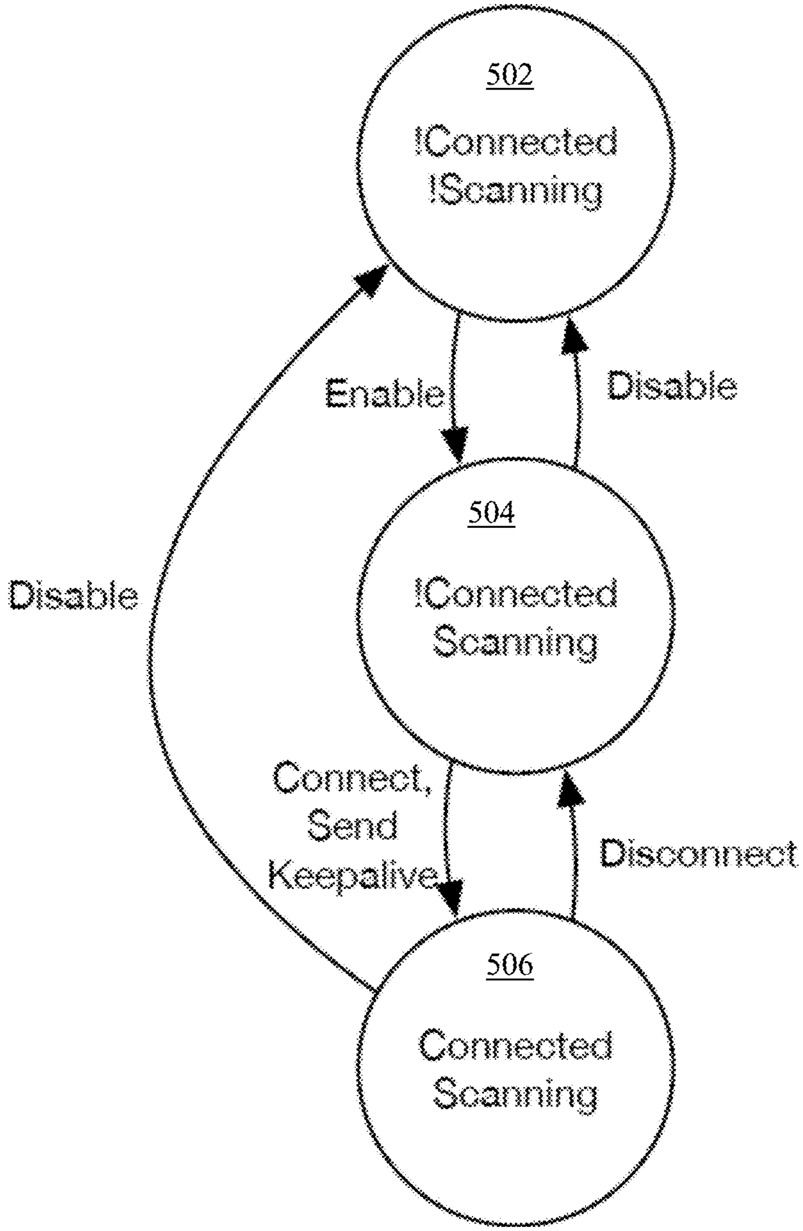
FIG. 5 illustrates a state/flow diagram which depicts the operation of the client device of FIG. 2, according to the disclosed embodiments.

FIG. 5. illustrates a state diagram 500 which depicts operations of the client device 102, with operating modes or states 502 504 506 representing the four combinations of connected/not connected and scanning/not scanning for advertising packets from source devices 104, e.g., to connect with. It will be appreciated that the state/operating modes of the client device 102 are implementation dependent and a given client device 102 may feature more or fewer operating modes. The client device 102 starts in the not connected and not scanning state 502, which is effectively a communications disabled state. If communications are enabled, by an operator or other trigger, the client device 102 transitions to the not connected and scanning state 504 to look for advertising packets from source devices 104, e.g., to connect with, as described.

While scanning, it may receive advertising packets from source devices 104 that are within range and are transmitting, which, if transmitted during a measurement timeout period subsequent to a prior connection, may contain generated measurement data, which the client device 102 may obtain, display or otherwise process. Once the client device 102 establishes a connection with a source device 104, it may send a command to enable measurements and, if necessary, set the measurement timeout, transitioning to the connected and scanning state 506. It remains in this state until it is either disconnected or is disabled, e.g., by a user or due to a time out or depletion of power, etc. During this state 506, the client device 102 receives communications from the source device 104 comprising the data indicative of the sensed parameter. The client device 102 may also send commands or data to the connected source device 104 depending upon the implementation.

The client device 102 may further continue to receive advertisement packets from the connected and/or other source devices 104, e.g., the client device may receive advertising packets from only the connected source device 104 for redundancy purposes or as an alternative communication channel, and/or from other source devices 104, such as for the purpose of establishing concurrent connections with multiple source devices 104. In an alternative embodiment, a connected/not scanning state (not shown) is provided in lieu of the connected and scanning state 506 such that, while connected, the client device 102 ceases looking for, or receiving, advertisement packets from source devices 104, e.g., to conserve power.

If the connection between the client device 102 and source device 104 is lost, e.g. because of interference or one or the other device has moved out of range, the client device 102 returns to the not connected scanning state 504 where, again, it is listening for advertising packets from source device 104, including the source device 104 from which it was disconnected and which may contain generated measurement data. As noted above, a client device 102 may intentionally disconnect from a source device 104 and return to either the not-connected scanning state 504 or not connected not scanning state 502. In one embodiment, upon a disconnection, e.g., an unintentional disconnection, from a given source device 104, the client device 102 may ignore, filter out or discard advertising packets received from other source devices 104, at least for a defined period of time, so as to prioritize reconnection with the source device 104 with which it was previously connected.

Figure 6:
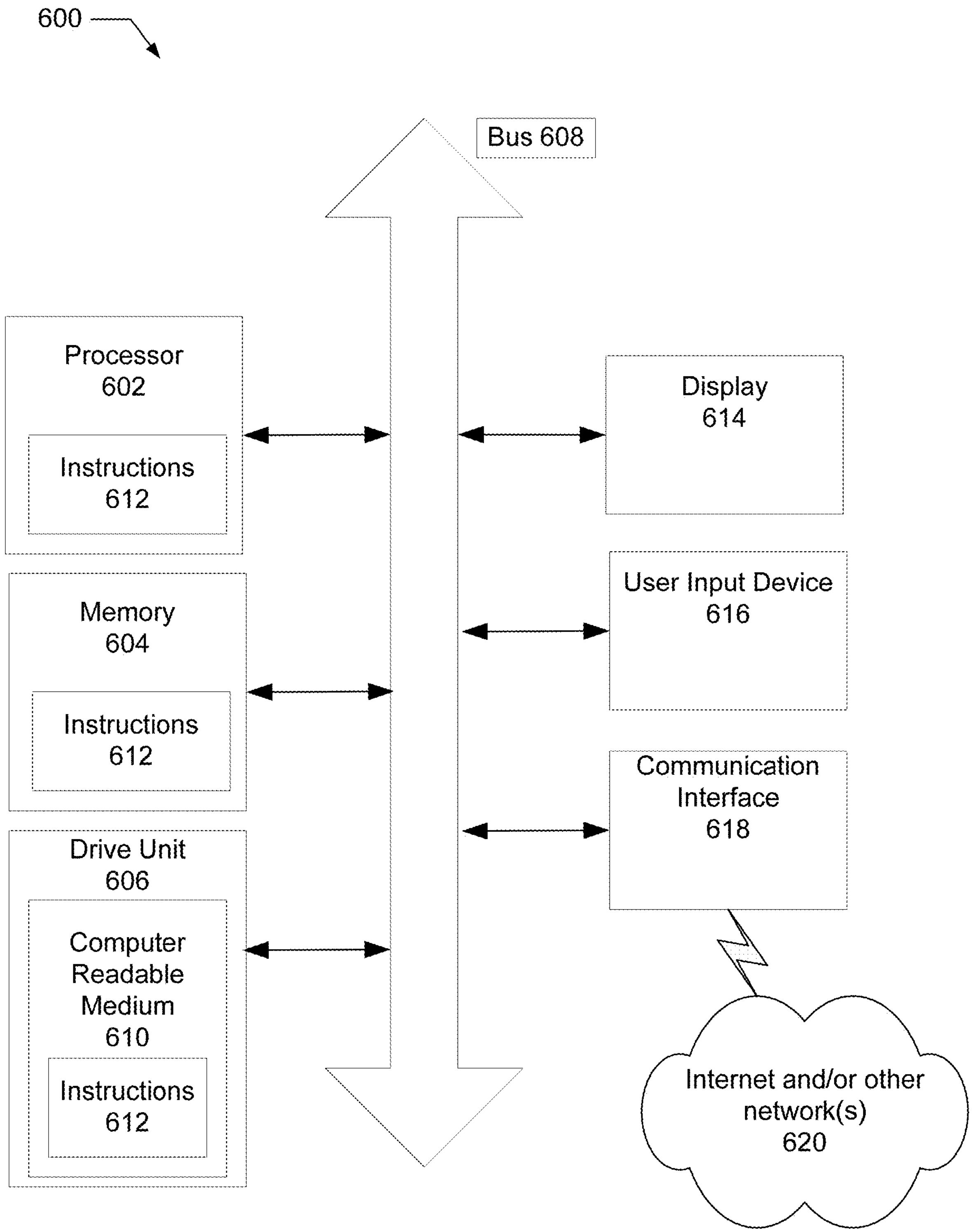
FIG. 6 depicts an illustrative embodiment of a general computer system for use with the disclosed embodiments.

Referring now to FIG. 6, an illustrative embodiment of a general computer system 600 is shown. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. Any of the components discussed herein, such as processor 602, may be a computer system 600 or a component in the computer system 600. The computer system 600 may be specifically configured to implement a client device 102 and/or source device 104 as described herein.

In a networked deployment, the computer system 600 may operate in the capacity of a server or as a client or user computer in a client-server user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 602 may implement a software program, such as code generated manually or via an artificial intelligence (i.e., programmed).

The computer system 600 may include a memory 604 that can communicate via a bus 608. The memory 604 may be a main memory, a static memory, or a dynamic memory. The memory 604 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, ferro-magnetic random access memory, magnetic tape or disk, optical media and the like. In one embodiment, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions 612 stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 614, such as a liquid crystal display (LCD), an organic light emitting diode (OLED), e-paper display, a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in the drive unit 606.

Additionally, the computer system 600 may include an input device 616 configured to allow a user to interact with any of the components of system 600. The input device 616 may be a number pad, a keyboard, an accelerometer (or other detector of physical movement), a voice control/input device, or a cursor control device, such as a mouse, or a joystick, touch screen display, remote control or any other device operative to interact with the system 600.

In a particular embodiment, as depicted in FIG. 6, the computer system 600 may also include a disk or optical drive unit 606. The disk drive unit 606 may include a computer-readable medium 610 in which one or more sets of instructions 612, e.g., software, can be embedded. Further, the instructions 612 may embody one or more of the methods or logic as described herein. In a particular embodiment, the instructions 612 may reside completely, or at least partially, within the memory 604 and/or within the processor 602 during execution by the computer system 600. The memory 604 and the processor 602 also may include computer-readable media as discussed herein.

The present disclosure contemplates a computer-readable medium that includes instructions 612 or receives and executes instructions 612 responsive to a propagated signal, so that a device connected to a network 620 can communicate voice, video, audio, images or any other data over the network 620. Further, the instructions 612 may be transmitted or received over the network 620 via a communication interface 618. The communication interface 618 may be a part of the processor 602 or may be a separate component. The communication interface 618 may be created in software or may be a physical connection in hardware. The communication interface 618 is configured to connect with a network 620, external media, the display 614, or any other components in system 600, or combinations thereof. The connection with the network 620 may be a physical connection, such as a wired Ethernet connection or may be established wirelessly. Likewise, the additional connections with other components of the system 600 may be physical connections or may be established wirelessly.

The network 620 may include wired networks, wireless networks, or combinations thereof. The wireless network may be a cellular telephone network, an 802.11, 802.16, 802.20, or WiMax network. Further, the network 620 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, ferro-magnetic memory, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

soliciting, by two or more source devices which each periodically generate new data for wireless communication to any of one or more client devices, a connection with any of the one or more client devices via a repeated wireless transmission of advertising packets not including the new data therein;

establishing a wireless connection by one of the two or more source devices with a client device of the one or more client devices based upon receipt, by the one of the two or more source devices, of a connection request wirelessly transmitted by the client device responsive to at least one of the transmitted advertising packets;

while connected with the client device, wirelessly communicating, by the one of the two or more source devices, new data generated thereby to the client device; and detecting, by the one of the two or more source devices, that the client device has disconnected therefrom and, based thereon, repeatedly wirelessly transmitting for a period of time, by the one of the two or more source devices, advertising packets, each including at least a portion of the new data which was generated by the one of the two or more source devices prior to the transmission thereof, wherein upon elapse of the period of time, when a connection with any of the one or more client devices is not established, the repeated wireless transmission of advertising packets not including new data therein resumes.

2. The computer implemented method of claim 1, wherein the client device transmits the connection request to the one of the two or more source devices based on a distance therebetween being less than a distance between the client device and another of the one or more source devices.

3. The computer implemented method of claim 1, further comprising:

establishing, subsequent to disconnection from the one of the two or more source devices, a wireless connection by another of the two or more source devices with the client device based upon receipt, by the other of the two or more source devices, of a connection request wirelessly transmitted by the client device responsive to at least one of the transmitted advertising packets; and while connected with the client device, wirelessly communicating, by the other of the two or more source devices, new data generated thereby to the client device.

4. The computer implemented method of claim 3, wherein prior to the establishing of the wireless connection with the one of the two or more source devices, the client device was within range thereof and out of range from other of the two or more source devices and prior to the establishing of the wireless connection with the other of the two or more source devices, the client device was within range thereof and out of range from the one of the two or more source devices.

5. The computer implemented method of claim 1, wherein, subsequent to the establishment of the connection with the client device, the repeated transmission of advertising packets continues, wherein each advertising packet includes at least a portion of the new data which was generated by the one of the two or more source devices prior to the transmission thereof.

6. The computer implemented method of claim 1, wherein the generating further comprises obtaining data directly and/or indirectly from another device remote from and coupled with the two or more source devices and operative to periodically generate updated data and transmit the updated data thereto for communication to any of the one or more client devices, the generated new data comprising the updated data received from the other device.

7. The computer implemented method of claim 1, wherein the generating further comprises obtaining data from a sensor coupled with the two or more source devices and operative to at least generate a signal indicative of at least one sensed parameter, the generated new data comprising data indicative thereof.

8. The computer implemented method of claim 5, wherein the sensor is remote from the two or more source devices.

9. The computer implemented method of claim 5, wherein the sensor comprises one of a temperature sensor, weight sensor, humidity sensor, ambient light sensor, or barometric sensor.

10. The computer implemented method of claim 1, wherein the sensor comprises a scale.

11. The computer implemented method of claim 1, further comprising:

where it is determined that the disconnection is intentional, resuming the repeated wireless transmission of advertising packets not including new data therein.

12. The computer implemented method of claim 1, wherein the periodic generation of new data for transmission occurs in a low power mode by a source device of the two or more source devices when not connected to any of the one or more client devices.

13. The computer implemented method of claim 1, further comprising:

reestablishing, subsequent to the disconnection, the wireless connection with the client device based upon receipt, by the one of the two or more source devices, of another connection request wirelessly transmitted by the client device responsive to at least one of the transmitted advertising packets; and while connected, wirelessly communicating, by the one of the two or more source devices, new data generated thereby to the client device.

14. The computer implemented method of claim 1, wherein, while disconnected, the client device receives the advertising packets, each including at least a portion of the new data which was generated by the one of the two or more source devices prior to the transmission thereof.

15. The computer implemented method of claim 14, wherein the client device ignores advertising packets received from any other of the at least two source devices for a defined period of time.

16. The computer implemented method of claim 1, wherein a geographic location of any of the at least two source devices and/or the client device is changing.

17. At least two devices, each operative to periodically generate new data for wireless communication to any of one or more client devices, each of the at least two devices comprising:

a transceiver configured for wireless communications;

a processor coupled with the transceiver and coupled with a memory, the memory having computer executable instructions stored therein which, when executed by the processor, cause the processor to:

solicit a connection with any of the one or more client devices via a repeated wireless transmission of advertising packets not including the new data therein;

establish a wireless connection with a client device of the one or more client devices based upon receipt of a connection request wirelessly transmitted by the client device responsive to at least one of the transmitted advertising packets when the client device is within range of that device;

while connected with the client device, wirelessly communicate new data generated thereby to the client device; and detect that the client device has disconnected and, based thereon, repeatedly wirelessly transmit advertising packets for a period of time, each including at least a portion of the new data which was generated prior to the transmission thereof, wherein upon elapse of the period of time, when a connection with any of the one or more client devices is not established, the repeated wireless transmission of advertising packets not including new data therein resumes.

18. The at least two devices of claim 17, wherein the computer executable instructions are further executable by the processor to cause the processor to cease the repeated transmission of advertising packets upon establishment of the connection with the client device and resume upon detection of client device having disconnected.

19. The at least two devices of claim 17, wherein the computer executable instructions are further executable by the processor to cause the processor to, subsequent to the establishment of the connection with the client device, continue the repeated transmission of advertising packets, wherein each advertising packet includes at least a portion of the new data which was generated by that device prior to the transmission thereof.

20. The at least two devices of claim 17, wherein the computer executable instructions are further executable by the processor to cause the processor to obtain data directly and/or indirectly from another device coupled with that device and operative to periodically generate updated data and transmit the updated data thereto for communication to any of the one or more client devices, the generated new data comprising the updated data received from the other device.

21. The at least two devices of claim 17, wherein the computer executable instructions are further executable by the processor to cause the processor to obtain data from a sensor coupled with that device and operative to at least generate a signal indicative of at least one sensed parameter, the generated new data comprising data indicative thereof.

22. The at least two devices of claim 21, wherein the sensor comprises one of a temperature sensor, weight sensor, humidity sensor, ambient light sensor, or barometric sensor.

23. The at least two devices of claim 21, wherein the sensor comprises a scale.

24. The at least two devices of claim 17, wherein the computer executable instructions are further executable by the processor to cause the processor to:

where it is determined that the disconnection is intentional, resume the repeated wireless transmission of advertising packets not including new data therein.

25. The at least two devices of claim 17, wherein the periodic generation of new data for transmission occurs in a low power mode when the device is not connected to any of the one or more client devices.

26. The at least two devices of claim 17, wherein the computer executable instructions are further executable by the processor to cause the processor to:

reestablish, subsequent to the disconnection, the wireless connection with the client device based upon receipt, by that device, of another connection request wirelessly transmitted by the client device responsive to at least one of the transmitted advertising packets; and while connected, wirelessly communicate, by that device, new data generated thereby to the client device.

27. The at least two devices of claim 19, wherein, while disconnected, the client device receives the advertising packets, each including at least a portion of the new data which was generated by the device prior to the transmission thereof.

28. The at least two devices of claim 27, wherein the client device ignores advertising packets received from any other of the at least two devices for a defined period of time.

29. The at least two devices of claim 17, wherein a geographic location of any of the at least two devices and/or the client device is changing.

30. A system comprising:

at least two source devices each operative to periodically generate new data for wireless communication to any of one or more client devices, each of the at least two source devices comprising:

a first transceiver configured for wireless communications;

a first processor coupled with the first transceiver and coupled with a first memory, the first memory having computer executable instructions stored therein which, when executed by the first processor, cause the first processor to:

solicit a connection with any of the one or more client devices via a repeated wireless transmission, via the first transceiver, of advertising packets not including the new data therein;

establish a wireless connection with a client device of the one or more client devices based upon receipt, via the first transceiver, of a connection request wirelessly transmitted by the first client device responsive to at least one of the transmitted advertising packets when the client device is within range of that device;

while connected with the client device, wirelessly communicate, via the first transceiver, new data generated thereby to the client device; and detect that the client device has disconnected therefrom and, based thereon, repeatedly wirelessly transmit, via the first transceiver, advertising packets, each including at least a portion of the new data which was generated prior to the transmission thereof;

each of the one or more client devices including:

a second transceiver configured for wireless communications;

a second processor coupled with the second transceiver and coupled with a second memory, the second memory having computer executable instructions stored therein which, when executed by the second processor, cause the second processor to:

receive, via the second transceiver, an advertisement packet comprising a solicitation of a connection from any of the at least two source devices and determine if the received advertising packets further contains new data;

extract, where it is determined that the received advertising packet contains new data, the new data contained therein;

transmit to the source device from which the advertisement packet was received, via the second transceiver, in response to the received advertisement packet, a connection request to establish a connection therewith;

during the connection, receive new data from the connected source device via the second transceiver; and detect that the connected source device has disconnected and based thereon determine if any advertisement packets have been subsequently received from that source device.

* * * * *